May 5, 1953 V. TRAD 2,637,829
PROJECTION TUBE WITH MOVABLE TARGET ELECTRODE
Filed March 15, 1952 3 Sheets-Sheet 1
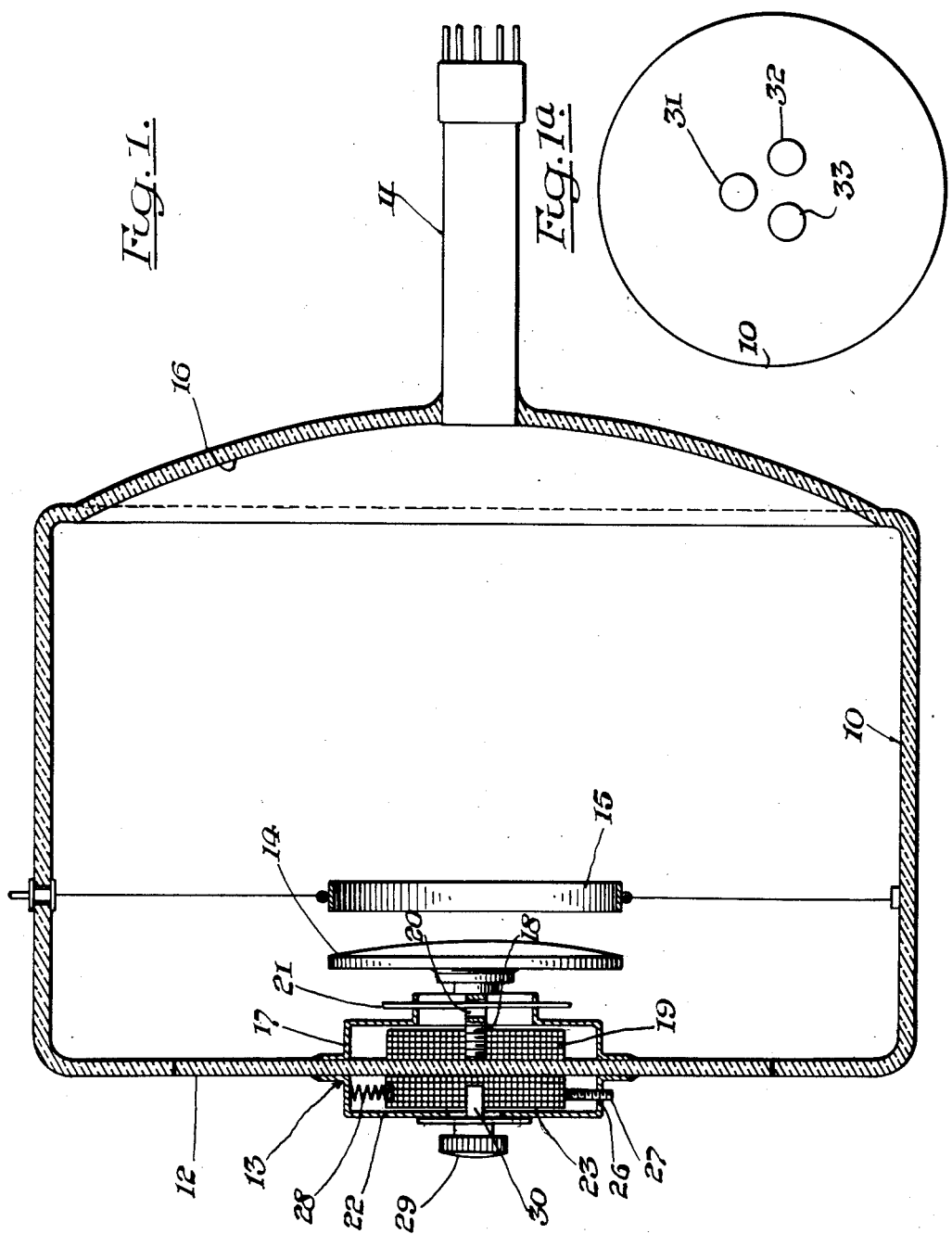
Inventor
Victor Trad
by his Attorney
Albert F. Kronman

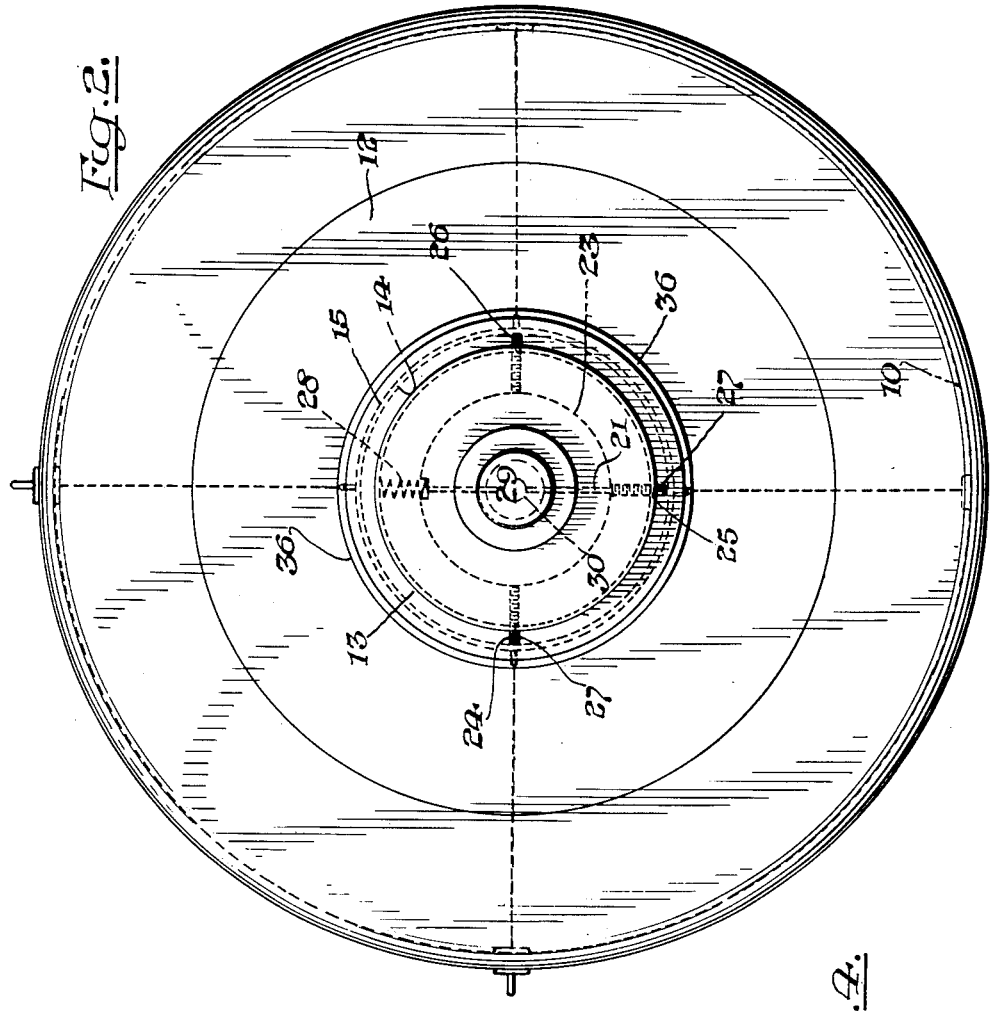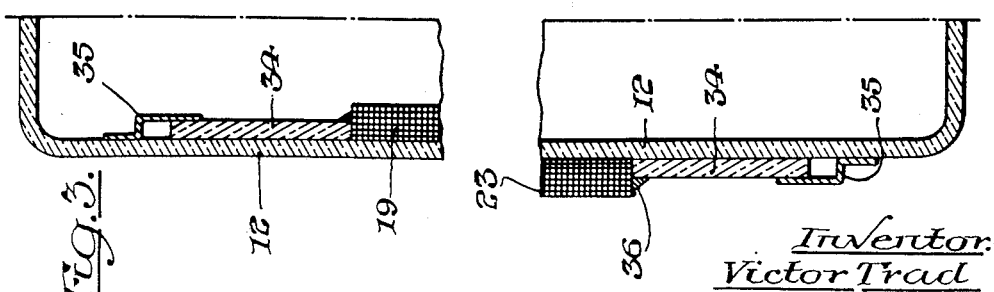

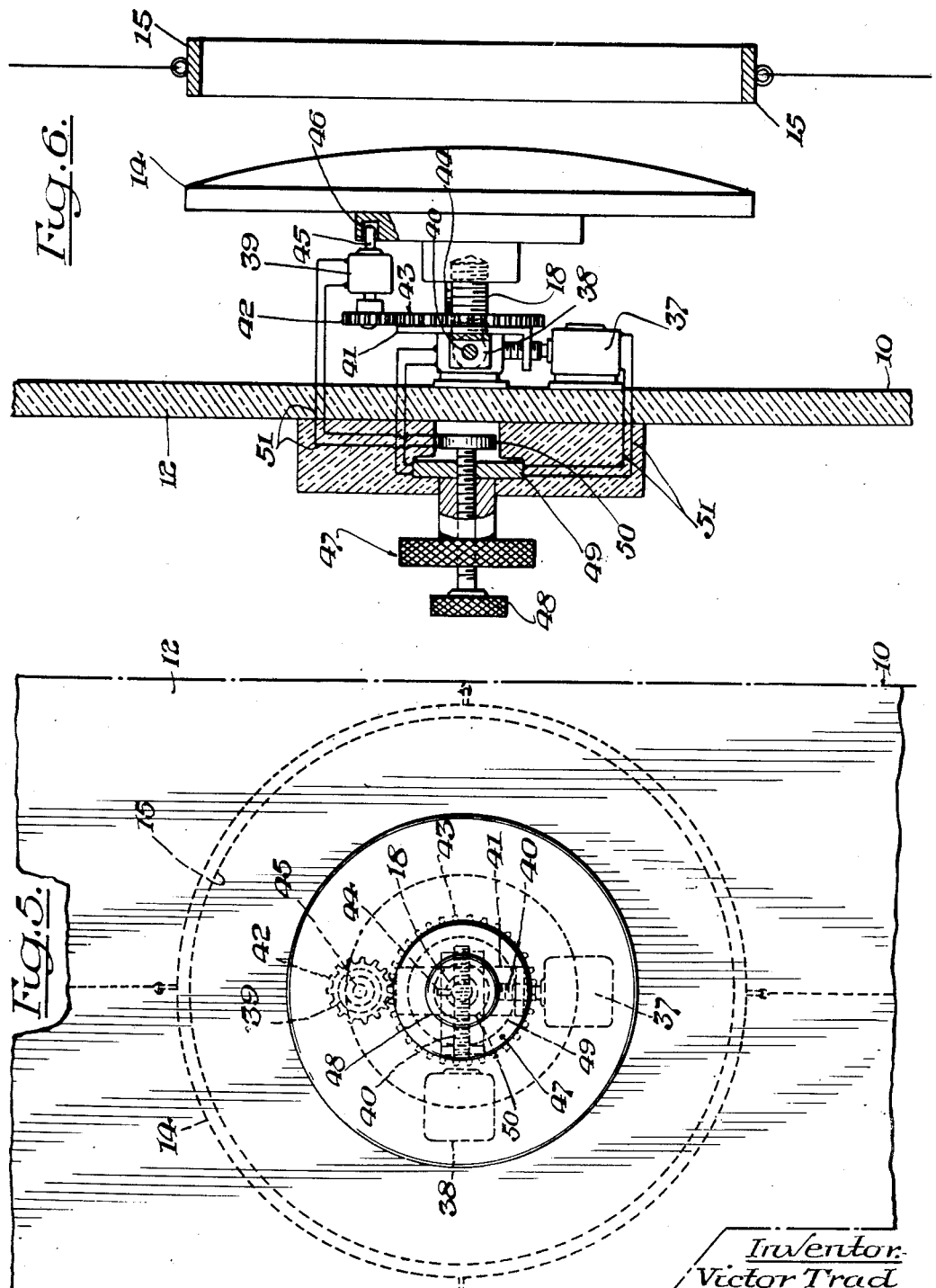

Patented May 5, 1953

2,637,829

UNITED STATES PATENT OFFICE 2,637,829

PROJECTION TUBE WITH MOVABLE TARGET ELECTRODE

Victor Trad, Asbury Park, N. J.

Application March 15, 1952, Serial No. 276,756

6 Claims. (Cl. 313—92)

This invention relates to a television projection tube such as may be used for the purpose of displaying images upon a large television screen.

Where television images are projected by means of a "Schmidt" lens system, there arises the problem of focusing the image upon the screen. If the lens system is exposed, the mirrored surfaces very often become clouded and soiled with a resultant loss in picture brightness. Additionally, where the screen to be viewed is disposed at an angle from the perpendicular (as is the case in motion picture houses) additional focusing means become necessary in order to prevent distortion.

Accordingly, it is an object of the present invention to provide a television projection tube having a built-in optical system together with a method of mechanically focusing said tube for different projection throws and angles.

Another object of the present invention is to provide a projection optical system which will be sealed within the tube.

A further object of the present invention is to provide means for focusing an optical system within the sealed envelope thereof.

The invention consists of the construction, combination and arrangement of parts, as herein illustrated, described and claimed.

In the accompanying drawings, forming a part hereof, are illustrated two forms of embodiment of the invention, in which drawings similar reference characters designate corresponding parts, and in which:

Figure 1 is a vertical section on one complete embodiment of a projection tube, in accordance with the present invention.

Figure 1-A is a modification of the tube shown in Figure 1, adapted for color projection.

Figure 2 is a view in front elevation of the projection tube shown in Figure 1.

Figure 3 is a fragmentary view of the front of a projection tube, in accordance with the present invention, showing a corrector plate incorporated within the envelope.

Figure 4 is a fragmentary view similar to that of Figure 3, in which the corrector plate is carried on the outside of the glass envelope.

Figure 5 is a somewhat diagrammatic view in front elevation of a second embodiment of the present invention.

Figure 6 is a fragmentary view in side elevation, somewhat enlarged, of the mechanism shown in Figure 5.

Referring to the drawings, and particularly Figures 1 and 2, 10 indicates a sealed glass envelope, such as may be used in connection with a cathode ray tube. An ion gun 11 is carried at the rear of the tube 10 in the well known manner. The front of the tube 12 comprises a flat, transparent surface, at the center of which there is carried a focusing device 13. The focusing device 13 is adapted to move a phosphor-coated faceplate 14, as hereinafter described. Between the faceplate 14 and the ion gun 11 there is provided the well known anode ring 15. The rear surface 16 of the envelope 10 is polished and mirrored, as well as optically ground to provide the curved reflecting surface of the "Schmidt" optical system. Inasmuch as this surface is contained within the vacuum of the tube, the necessity for cleaning this surface is eliminated.

When the tube is in operation electrons from the ion gun 11 strike the phosphor-coated faceplate 14 and the image is formed upon this plate. In the present embodiment of the invention herein, the image is taken from the striking side of the faceplate 14, and projected upon the mirrored surface 16 of the tube. In this way, illumination as high as three times the intensity of the conventional direct projection system may be obtained.

In order to adapt the tube for use with a variety of focal distances, it is necessary to provide some means for changing the position of the faceplate 14. One method for achieving this result is shown in Figures 1 and 2, and consists of a bracket 17, secured to the inside of the front plate 12 of the tube. The bracket 17 is adapted to secure in an axial position a worm 18, which worm is received within a permanent magnet 19, disposed within the said bracket 17. The permanent magnet 19 is centrally threaded to accommodate the worm 18. A slot 20 is cut in the worm 18 and a pin 21 thrust therethrough and engaged with the bracket 17, so as to prevent rotation of said worm 18.

The faceplate 14 is secured to the inner end of the worm 18, as shown in Figure 1. An external bracket 22 is secured to the outside of the front plate 12, so as to be in register with the inner bracket 17.

A second permanent magnet 23 is carried within the external bracket 22. The bracket 22 is provided with threaded openings 24, 25, 26, best shown in Figure 2. Small set screws 27 are received within the threaded openings in the external bracket 22. The location of the openings 24, 25, 26 is such that two of the screws 27 are disposed in openings 24, 26, along the same axis, while the third screw 27 is located in the opening 25, which is in a line normal to the axis of the opposed screws in openings 24, 26.

A coil spring 28 is carried by the bracket 22 at a point opposite the opening 25. It is to be understood that a fourth screw can be substituted for the coil spring 28.

The second permanent magnet 23, which is preferably circular in shape, is supported by the bracket 22, and the screws 27 and spring 28. A knob 29, having a shaft 30 secured thereto and projecting through the bracket 22 at the center thereof, is secured to the outer magnet 23 by means of said shaft 30. It will be seen from the foregoing that rotation of the knob 29 will cause the outer permanent magnet 23 to turn about the shaft 30. By reason of the magnetic linkage, the inner magnet 19 will also be caused to rotate in accordance with the motion imparted to the outer magnet 23.

Inasmuch as the inner magnet is centrally threaded, and the worm 18 engaged thereby, rotation of said inner magnet 19 will cause the worm to move away from, or in the direction of the front plate 12 of the tube 10. (Said motion is dependent upon the direction of rotation of the magnets 19 and 23.)

Accordingly, there has been provided a means for focusing the faceplate 14 of the "Schmidt" projection system, without interfering with the sealed vacuum within the envelope.

Where the above described tube is used in conjunction with screens which may be disposed at an angle from the perpendicular, it becomes necessary to move the faceplate 14 with respect to its location upon the front plate 12. This motion is accomplished by means of the set screws 27. It will be seen that by advancing or retracting one or more of the screws 27, the disposition of the outer magnet 23, and therefore, the location of the inner magnet 19 and plate 14, may be affected.

Where it is desired to project colored images, the above structure may be employed with the modification shown in Figure 1-A. This construction employs the tube 10 with three ion guns 31, 32, 33, in place of the single gun 11, shown in Figure 1. The ion guns 31, 32, 33 are each capable of emitting a stream of ions having a characteristic primary color. The faceplate 14 used in conjunction with the tri-color gun, is covered with suitable color phosphors which are energized by the tri-color gun. It will thus be seen that there has been provided a television projection system whereby colored pictures of any size, having more than satisfactory brightness, may be produced.

Referring to Figures 3 and 4, there are shown two modifications of the tube shown in Figure 1. The front plate 12 in Figure 1 may be ground to specification to act as the corrector plate of the optical system. Alternately, the front plate 12 may be of flat clear glass to which a corrector plate 34 may be secured either internally, as shown in Figure 3, or externally, as appears in Figure 4. The corrector plate 34 may be held to the front plate 12 by means of a bracket 35. The bracket 35 should be of sufficient size to enable the corrector plate 34 to move therein in response to the adjustment given to the permanent magnet 19 or 23, to which said corrector plates 34 are secured, as indicated at 36.

Referring to Figures 5 and 6, there is shown a second embodiment in accordance with the present invention, in which embodiment the motion imparted to the faceplate 14 stems from the operation of three small motors 37, 38, 39, located within the envelope of the tube 10. Motors 37 and 38 are provided with worms 40, secured to the shafts thereof, which worms engage a faceplate support 41. By energizing the motors 37, 38 there may be imparted to the bracket a suitable motion across the front plate 12 of the tube 10. This motion is identical in nature and purpose to that previously described in connection with the screws 27 on the bracket 22. The face plate supporting bracket 41 carries at the center thereof a worm 18, which worm is threadably engaged with the faceplate 14, as shown in Figure 6.

The motor 39 is adapted to drive a small gear 42, which is in mesh with a larger gear 43 coupled to the worm 18 by means of a key 44. A pin 45 is inserted within a suitable opening 46, in the rear of the faceplate 14, to prevent said faceplate from rotating when the motor 39 turns the gears 42 and 43, thereby causing the worm 18 to rotate and enter or leave the back of the plate 14, as the case may be.

The knobs 47, 48, shown on the outside of the front plate 12 in Figure 6, are connected to switches 49 and 50, which switches in turn activate the motors 37, 38, 39, respectively. The motors 37, 38, 39 are supplied with current from a suitable source (not shown) by means of leads 51, which traverse the front plate 12, and are sealed therein so as not to interfere with the vacuum of the tube.

From the foregoing it will be seen that all of the necessary motion requisite to focus and orient the image coming from the ion gun or the tri-color gun, may be provided by the manipulation of the knobs 47, 48.

Having thus fully described the invention, what is claimed as new and desired to be secured by Letters Patent of the United States, is:

1. A television image projection tube comprising, a sealed envelope having a transparent front wall, a rear wall, an ion gun carried by the rear wall of the envelope so that its ion stream is directed toward the front wall, a light reflecting surface upon the rear wall, a faceplate to receive the ion stream, movably fastened to the envelope adjacent the front wall by means of a bracket carried upon the inner face of the front wall and means positioned on both sides of the front wall of the envelope whereby the position of the faceplate within the tube may be changed so as to focus and orient the image without disturbing the seal of the said tube.

2. A television image projection tube comprising, a sealed envelope having a transparent front wall, a rear wall, an ion gun carried by the rear wall of the envelope so that its ion stream is directed toward the front wall, a light reflecting surface upon the rear wall, a faceplate to receive the ion stream, movably fastened to the envelope adjacent the front wall by means of a bracket carried upon the inner face of the front wall and means positioned on both sides of the front wall of the envelope consisting of a worm rotatably carried by the non-image forming side of the faceplate, a first permanent magnet within the tube, into which the worm is threadably received, a second permanent magnet upon the outer surface of the front wall, and magnetically linked to the first permanent magnet and adjusting means by which the second magnet may be rotated or moved laterally to control the inner magnet whereby the position of the faceplate within the tube may be changed so as to focus and orient the image without disturbing the seal of the said tube.

3. A television image projection tube comprising, a sealed envelope having a transparent front wall, a rear wall, an ion gun carried by the rear wall of the envelope so that its ion stream is directed toward the front wall, a light reflecting surface upon the rear wall, a faceplate to receive the ion stream, movably fastened to the envelope adjacent the front wall by means of a bracket carried upon the inner face of the front wall and means positioned on both sides of the front wall of the envelope consisting of a worm rotatably carried by the non-image forming side of the face plate, a first permanent magnet within the tube, into which the worm is threadably received, an outer bracket, a second permanent magnet upon the outer surface of the front wall within the outer bracket, and magnetically linked to the first permanent magnet and adjusting means by which the second magnet may be rotated or moved laterally to control the inner magnet whereby the position of the faceplate within the tube may be changed so as to focus and orient the image without disturbing the seal of the said tube.

4. A television image projection tube comprising, a sealed envelope having a transparent front wall, a rear wall, an ion gun carried by the rear wall of the envelope so that its ion stream is directed toward the front wall, a light reflecting surface upon the rear wall, a faceplate to receive the ion stream, movably fastened to the envelope adjacent the front wall by means of a bracket carried upon the inner face of the front wall and means positioned on both sides of the front wall of the envelope consisting of a worm rotatably carried upon the non-image forming side of the face plate, a first permanent magnet within the tube, into which the worm is threadably received, an outer bracket, set screws radially carried by the outer bracket and communicating with the area within said bracket, a second permanent magnet upon the outer surface of the front wall within the outer bracket supported upon the set screws and magnetically linked to the first permanent magnet and adjusting means by which the second magnet may be rotated or moved laterally to control the inner magnet whereby the position of the faceplate within the tube may be changed so as to focus and orient the image without disturbing the seal of the said tube.

5. A television image projection tube comprising, a sealed envelope having a transparent front wall, a rear wall, an ion gun carried by the rear wall of the envelope so that its ion stream is directed toward the front wall, a light reflecting surface upon the rear wall, a faceplate to receive the ion stream, movably fastened to the envelope adjacent the front wall by means of a bracket carried upon the inner face of the front wall, means positioned on both sides of the front wall of the envelope consisting of a worm rotably carried by the non-image forming side of the face plate, a first permanent magnet within the tube, into which the worm is threadably received, an outer bracket, set screws radially carried by the outer bracket and communicating with the area within said bracket, a second permanent magnet upon the outer surface of the front wall within the outer bracket supported upon the set screws, and magnetically linked to the first permanent magnet and adjusting means comprising a knob secured to the second magnet by a shaft together with the set screws carried by the outer bracket by which the second magnet may be rotated or moved laterally to control the inner magnet whereby the position of the face plate within the tube may be changed so as to focus and orient the image without disturbing the seal of the said tube.

6. A television image projection tube comprising, a sealed envelope having a transparent front wall, a rear wall, an ion gun carried by the rear wall of the envelope so that its ion stream is directed toward the front wall, a light reflecting mirrored surface upon the rear wall, said reflecting surface being ground to provide a reflection element for a "Schmidt" projection system, a faceplate to receive the ion stream, said faceplate having a phosphor coating thereon and being formed to pass the image formed thereon to the reflecting surface, the faceplate being movably fastened to the envelope adjacent the front wall by means of a bracket carried upon the inner face of the front wall, an image correcting plate within the tube between the faceplate and the front wall and means positioned on both sides of the front wall of the envelope consisting of a worm rotatably carried by the non-image forming side of the faceplate, a first permanent magnet within the tube, into which the worm is threadably received, an outer bracket, set screws radially carried by the outer bracket and communicating with the area within said bracket, a second permanent magnet upon the outer surface of the front wall within the outer bracket supported upon the set screws, and magnetically linked to the first permanent magnet and adjusting means comprising a knob secured to the second magnet by a shaft together with the set screws carried by the outer bracket by which the second magnet may be rotated or moved laterally to control the inner magnet whereby the position of the faceplate within the tube may be changed so as to focus and orient the image without disturbing the seal of the said tube.

VICTOR TRAD.

References Cited in the file of this patent

UNITED STATES PATENTS

| Number | Name | Date |
|---|---|---|
| 2,267,769 | Von Ardenne | Dec. 30, 1941 |
| 2,435,316 | Larson | Feb. 3, 1948 |
| 2,440,735 | Cawein | May 4, 1948 |
| 2,453,003 | Edwards | Nov. 2, 1948 |
| 2,520,190 | Amdursky | Aug. 29, 1950 |